Oct. 10, 1950      G. R. BOSSETTA      2,525,165

SELECTOR-TYPE BOOK REEL AND CABINET

Filed May 28, 1947      2 Sheets-Sheet 1

Inventor

Gaspar R. Bossetta

By Clarence A. O'Brien
and Harvey B. Jacobson
Attorneys

Oct. 10, 1950   G. R. BOSSETTA   2,525,165
SELECTOR-TYPE BOOK REEL AND CABINET
Filed May 28, 1947   2 Sheets-Sheet 2
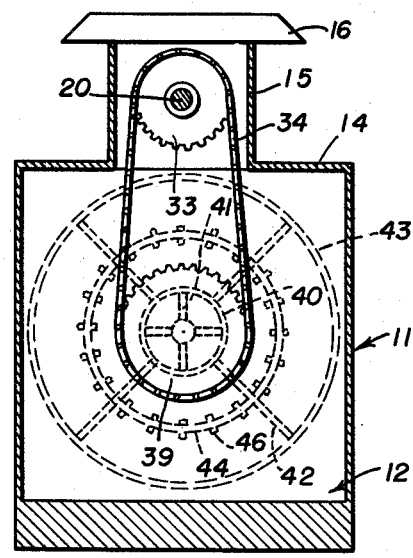
Fig. 4.
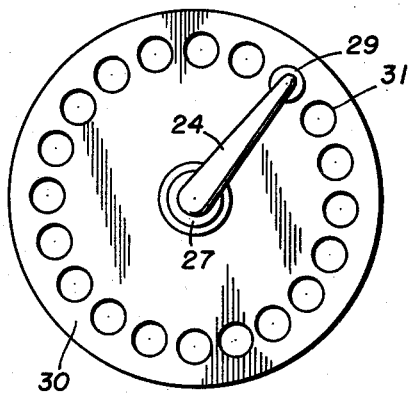
Fig. 5.
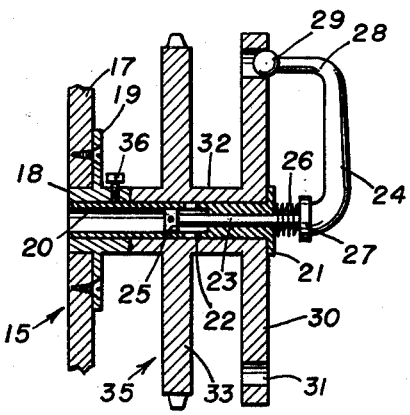
Fig. 6.
Fig. 9.
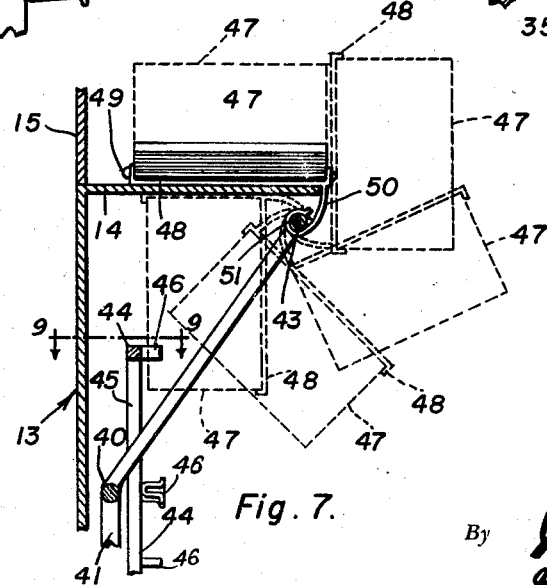
Fig. 7.
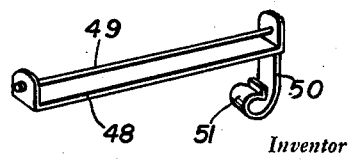
Fig. 8.
Inventor
Gaspar R. Bossetta
By Clarence A. O'Brien
and Harvey B. Jacobson
Attorneys

UNITED STATES PATENT OFFICE 2,525,165

SELECTOR-TYPE BOOK REEL AND CABINET

Gaspar R. Bossetta, New Orleans, La.

Application May 28, 1947, Serial No. 750,949

8 Claims. (Cl. 312—34)

The present invention relates to improvements in book cases and cabinets and has more particular reference to a novel and improved structure characterized by a rotary book reel, a cabinet therefor and an illuminable selector-type dial construction.

An object of the invention is to provide a simple, practical and readily usable mechanical device of a manually controlled and regulated nature which is adapted for convenient research purposes by doctors, lawyers and others called upon, in line of duty, to make notes and to give information reports based on authoritative information chosen from selected text, case, and equivalent reference books.

Another object of the invention is to provide an ingenious selector-type book reel and cabinet wherein the desired reference books are systematically arranged in and carried by an easily turnable reel, the latter being such in construction and adaptability that a selected book may be conveniently and expeditiously chosen and moved to a position from which said book may be satisfactorily situated on the desk-forming top of the cabinet and spread open for study and note-taking purposes.

A further object of the invention appertains to a novel structural adaptation of the nature above described wherein the desired books are conveniently racked in the reel through the medium of means in which all books, but the one in use at the time, are maintained in out-of-the-way position, the book holding and racking means being such that all books are mechanically hinged on the reel, this in such a way that the books may be swung in and out to meet the needs and requirements of the user.

A still further object of the invention has to do with a novel selector-type book reel and cabinet in which the reel is housed, the top wall of the cabinet serving as a convenient shelf or desk, whereby the user may place a book on the shelf, after swinging same out of the reel, whereby to permit the desired research and note-taking results to be expeditiously accomplished.

What is more, and in addition to the above, an illuminable dial is used in conjunction with the stated desk, said dial, in practice, having suitable indicia for rapid book selection purposes, the dial constituting a part of the means for rotating the book reel, and having cooperable therewith a readily available and usable crank enabling the desired book to be systematically selected and brought up and swung out for use on said desk.

More specifically, the preferred embodiment of the invention embodies an open front cabinet or equivalent supporting structure, a rotary annular reel mounted for convenient rotation in the cabinet, the reel being mechanically driven from the selector-dial means, the books having individual suitable holding devices and said devices being hingedly mounted on the perimeter portion of the reel and said reel having internal means to assist in holding the books in properly racked state, whereby to insure practicality and overall efficiency in use.

Other objects and advantages will become more readily apparent from the following description and the accompanying illustrative drawings.

In the accompanying drawings, wherein like numerals are employed to designate like parts throughout the views:

Figure 4 is a section on the vertical line 4—4 of Figure 3, looking in the direction of the arrows;

Figure 5 is an enlarged elevation of the selector-dial and crank handle;

Figure 6 is a fragmentary sectional and elevational view of the selector-dial means;

Figure 7 is a fragmentary sectional and elevational view showing portions of the reel and cabinet and detailing the book holding and hinging means;

Figure 8 is a perspective view of one of the book holding and hinging brackets; and Figure 9 is a fragmentary view showing book retaining clip means, the section being enlarged and taken approximately on the line 9—9 of Figure 7.

Figure 1:
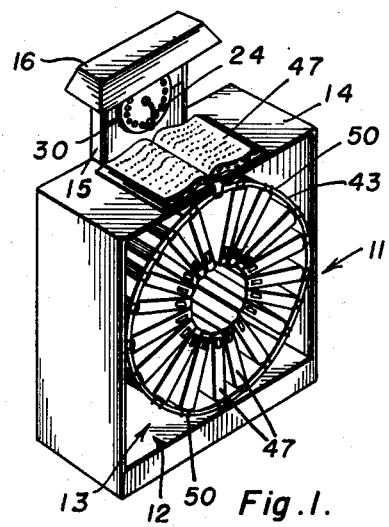
Figure 1 is a perspective view of a selector-type book reel and cabinet constructed in accordance with the principles of the invention wherein the manner of selecting and using a book is suitably illustrated.
Figure 2:
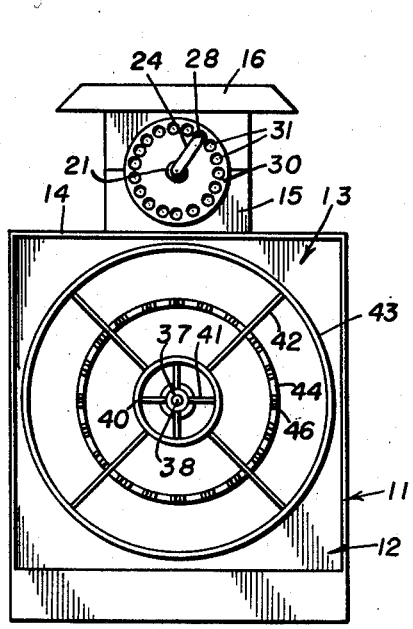
Figure 2 is a front elevational view of the structure seen in Figure 1.
Figure 3:
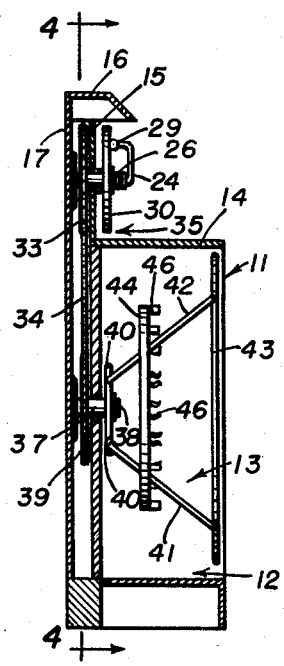
Figure 3 is a central vertical sectional view with principal parts in elevation.

Although a suitable supporting structure, such as a base-equipped stand may be employed, I prefer that the structure utilized for the purpose be in the nature of an open front box-like cabinet 11. This is of appropriate proportions and material and, in practice, the open front may be enclosed with suitable closure means (not shown). The cabinet primarily provides a compartment 12 for the rotary reel means 13. In addition, however, it provides a shelf 14 at the top which may be employed as a book rest and desk. An extension 15 is provided and this extends above the rear edge portion of the desk and has an appropriate reflector 16 with an appropriate bulb or other source of illumination (not detailed). As brought out in Figure 6, one vertical wall 17 of the extension is apertured and provided with a bushing 18 secured in place by an attaching flange 19 and this serves to retain in place a hollow axle 20, the outer or right-hand end of which is flanged as at 21. Incidentally, the outer flanged end portion of the axle is thickened to provide a bearing and also a shoulder 22, said bearing serving to accommodate the spindle portion 23 of a dial turning hand crank 24. The inner end of the spindle is provided with a stop collar 25 engageable with the shoulder 22 to accommodate a coiled return spring at 26. The return spring 26 co-acts with a collar or flange 27 on the hand crank. Incidentally, the free end portion of the hand crank is directed rearwardly and laterally as at 28 and is provided with a terminating ball 29 which constitutes a keeper and actuator for the disc-like dial 30. The dial is provided with circumferentially spaced marginal keeper holes or sockets 31. Incidentally, these holes, in practice, are appropriately numbered, provided with legends or otherwise marked to identify and permit proper selection of books. The dial is formed as an integral part of a hub structure 32 which is rotatable on the axle 20 and which also includes a sprocket wheel 33, this to accommodate sprocket chain 34 (see Figs. 3 and 4). It might be mentioned here that unitarily speaking, the hub means, sprocket wheel, dial and selector and turnable crank means constitute a selector-dial and operating assembly denoted, unitarily visualized, by the numeral 35 in Figure 6.

Still considering Figure 6, the bushing 18 is fixed and the tubular shaft or axle, which serves as a journal for the means 35, is removably held in place by a set screw 36. The spindle 23 is assembled in the bearing of the shaft by the collar means 25 and the spring 26 normally presses against the flange 27 and urges the crank 24 to a position normally disengaged from the dial. Thus, in order to operate the dial, the then disengaged crank 24 must be grasped by the hand and pressed, against the tension of the spring 26, at which time the keeper head or ball 29 may be connected with one of the keeper sockets 31. This makes it possible to swing the crank and turn the dial and sprocket means, all as a unit, in relation to the relatively fixed shaft means 20. Reference being had now to the book racking, rotating and vending reel 13, this comprises a hub structure 37 (see Fig. 3) mounted for rotation on suitable journal means 38 carried in the cabinet. The hub structure is provided with a second sprocket wheel 39 to accommodate the aforementioned sprocket chain 34. A relatively small ring 40 is attached by spokes 41 to the hub structure. This ring supports outwardly diverging larger spokes 42 which, in turn, support the main reel forming ring 43. There is an intervening or third ring at 44 attached by spokes 45 (see Fig. 7) to the spokes 42. This third ring is provided with U-clips (see Fig. 9) which clips are denoted by the numeral 46 and are adapted to resiliently grip and hold the books 47 in systematically racked, out-of-the-way position within the confines of the reel and cabinet. Each book is individually and hingedly mounted and to accomplish this, I provide a device of the type shown in Figure 8. This comprises a U-shaped bracket 48 which properly seats the binder of the book, said bracket having an appropriate retaining rod 49 which fits into the book, in an obvious manner. The outer end of the bracket is provided with a lateral arm 50 having a spring curl 51 which is hingedly connected with the reel ring 43. It will be noted, in Figure 7, that the hinging members 51 are resilient and are therefore not only hingedly mounted but are detachable to permit the various text, case, and other books to be exchanged, inserted and removed at will.

In operation, it is obvious that the books are individually, hingedly and detachably mounted in the reel structure in systematic order. They are racked and held in place by the retaining clips 46. Under this arrangement the books are held against displacement during steps of rotating the reel means 13, as is obvious. When a particular reference book is wanted by the user, the actuator head 29 on the crank 24 is engaged with the desired and selected opening 31 in the dial. As previously stated, the openings are suitably marked to permit the selection to be made. By holding the crank in position against the tension of the spring means 26, the dial is rotated and, simultaneously, the entire head structure 35 is turned. This imparts movement to the sprocket chain 24 and the sprocket wheel, whereby the reel means 13 is rotated. When the desired book is brought to the top, it is swung out and up and placed in open position on the desk or shelf 14.

It can be easily seen, as soon as the citation is found and noted on a pad, placed on the shelf or desk, the book can be closed, swung down on its hinge to its proper position on the reel and then the wheel or reel, turned to the right or to the left so as to place the next volume wanted in the position of the former one, so that it can be swung upon its hinge and placed in proper using position. After this volume has been used, it can in turn be closed and swung in its position and so forth, until all of the necessary volumes have been used in the research thus, at conclusion, all books are in place and require no further attention.

The invention is not restricted to law books but can be used for research with medical books, encyclopedia or in any work where a set of say, 20 volumes, are used.

It is not my purpose here, as is obvious, to dwell upon the nature of the volumes and books which are stored and racked for use in the cabinet enclosed reel, for such as are commercial aspects of the invention and will be clear to users whether they be doctors, lawyers or others in similar research fields.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A selector-type book reel of the class described comprising an open front reel cabinet including a horizontal flat top providing a book shelf, a book holding and delivering reel mounted for rotatable operation in said cabinet, and projectible and retractable book holders for selectively usable books, each book holder being hingedly connected at its inner end with the reel in a manner to permit the chosen book to be swung out through the open front of the cabinet, placed atop said shelf for study and other purposes, and subsequently swung back into and normally maintained in an out-of-the-way position on said reel.

2. A selector type book holding and delivering cabinet comprising an open front reel cabinet including a horizontal top member conveniently employable as a book shelf, a book racking and delivering reel mounted for rotation in said cabinet and accessible by way of said open front, said reel including a ring mounted in the cabinet and adjacent to said open front, and a plurality of book clamping brackets, said brackets having arms and said arms being provided with hinging clips separably and hingedly connected at circumferentially spaced points to said ring, said brackets being normally within the confines of the reel and cabinet and being swingable outwardly through said open front and adapted to rest, with book attached, on said shelf and subsequently swung back into the cabinet.

3. The structure specified in claim 2, wherein said reel has circumferentially spaced individual book grasping and sustaining clips to prevent the books and brackets from dangling loose while racked for rotation in said reel.

4. A manually controllable selector type book cabinet comprising an open front cabinet, a book racking and delivering reel mounted for rotation in said cabinet and provided, adjacent said open front, with a ring and provided interiorly of said first ring with a second ring, the latter being provided with circumferentially spaced book gripping and retaining clips, books mounted removably in the clips, a bracket removably clamped on each book and having an elongated arm and a right angularly disposed member hingedly mounted on said first named ring, said bracket arms when not in use being swingable into close proximity to said rings so that the books may be fastened in said clips and said arms when extended for use projecting outwardly through the open front of the cabinet and being adapted for resting atop the cabinet when the books are in use.

5. A selector-type book cabinet of the class described comprising an open front cabinet, a central shaft mounted in said cabinet, a ring attached by radial spokes to said shaft, a second ring, larger than the first ring and attached to said first ring by radially spaced outwardly diverging spokes, a third ring connected by radial spokes with the second named spokes, said third ring being between the first and second rings and having circumferentially spaced book clips, a plurality of book holders, each book holder embodying a U-shaped bracket having clamping means for fastening a book thereto, one end of said bracket being provided with a lateral arm formed with a clip and said clip being hingedly mounted on the second named reel ring, said brackets being swingable toward said book clips and the latter serving to hold the books racked in out-of-the-way positions within the reel.

6. A selector-type book reel and cabinet of the type shown and described comprising a cabinet including a horizontal rigid top portion constituting a book shelf and having an open front through which the books are selectively projectable and retractable, a shaft mounted horizontally for rotation in said cabinet, a reel mounted for rotation with said shaft, projectable and retractable clamp-equipped book brackets hingedly mounted on said reel and normally held in retracted positions within the confines of said reel, said brackets being swingable outwardly through the open front to permit the books thereon to be placed atop said shelf, a second shaft mounted for rotation above said shelf, an operating connection between said shafts, a selector dial mounted on said second named shaft, and a hand crank independently mounted for rotation on said second named shaft, said hand crank being releasably engageable with said dial for turning the latter, said shafts and reel.

7. A selector-type book reel and cabinet construction of the class described comprising a cabinet, a book racking and delivering reel mounted for rotation in said cabinet, said reel embodying a shaft provided with a sprocket wheel, a second shaft mounted above the top of said cabinet, said top constituting a book shelf, said second shaft being provided with a sprocket wheel, and, a sprocket chain trained over the respective sprocket wheels, a dial formed integral with said second named sprocket wheel, said dial having circumferentially spaced selector holes, a hand crank slidably and rotatably mounted on said second named shaft, said hand crank having a detent releasably engageable with the holes in said dial, whereby when the hand crank is connected to the dial and the dial is turned, the sprocket wheels, sprocket chain, reel and books on the reel are also turned.

8. A selector-type reel and book cabinet comprising an open front reel cabinet having a top constituting a book shelf, a reel mounted for rotation in said cabinet and accessible through said open front, a plurality of projectable and retractable brackets mounted on and carried by said reel, means for clamping the books individually on the respective brackets, said brackets being swingable outwardly through said open front and into position on said shelf to permit books to be consulted, said brackets, when the books are not in use, being swingable into the cabinet and within the confines of said reel, an axle supported horizontally above said shelf, a hub unit mounted for rotation on said axle and including a marginally apertured dial, an operating connection between said hub unit and reel to turn the reel when the hub unit is turned, said axle being hollow, a hand crank slidably and rotatably mounted in said axle, said hand crank being opposed to said dial and being provided on its free end with a ball member selectably and releasably engageable with the apertures in said dial.

GASPAR R. BOSSETTA.

REFERENCES CITED

The following references are of record in the file of this patent:

UNITED STATES PATENTS

| Number | Name | Date |
|---|---|---|
| 817,956 | Carman | Apr. 17, 1906 |
| 875,366 | Moore | Dec. 31, 1907 |
| 1,150,389 | Ryley | Aug. 17, 1915 |
| 1,269,825 | Langdon | June 18, 1918 |
| 1,796,496 | Volkmar | Mar. 17, 1931 |
| 2,235,736 | Bruen | Mar. 18, 1941 |
| 2,300,422 | Hickman | Nov. 3, 1942 |